United States Patent Office

2,812,237
Patented Nov. 5, 1957

2,812,237

PREPARATION OF ALKALI METAL FLUOTITANATES

Eugene Wainer, Cleveland Heights, Ohio, assignor, by mesne assignments, to Horizons Titanium Corporation, Princeton, N. J., a corporation of New Jersey No Drawing. Application January 31, 1952, Serial No. 269,145

6 Claims. (Cl. 23—88)

In the use of the double fluorides of titanium and ammonium, potassium or sodium cost is a major item limiting their application. These raw materials are used as flux ingredients in non-ferrous and ferrous metallurgy and as a source of titanium metal through the medium of a variety of complex reactions. Known methods of preparing the compounds involve the formation of a fluorine derivative of titanium in solution, usually through the medium of attack of a suitable raw material with hydrofluoric acid and then precipitating the desired compound through the addition of a proper alkali metal fluoride. All of the reagents used in such a procedure are quite expensive and the end result is that the product is costly.

In the usual technology of titanium, one stage in the purification from its ores usually involves the preparation of a sulfate derivative characterized by its insolubility in water. In any case, in order to prepare these derivatives for purification purposes with the eventual idea of obtaining a chemically pure titanium dioxide, sufficient sulfuric acid must be added in the treatment of the starting raw material so that the entire ore body is put completely in solution except for such insolubles as silicates.

It is well known in the art, the most economical raw material for titanium is the mineral ilmenite. In the usual method of decomposing ilmenite preparatory to preparation of pure titanium compounds therefrom, the ilmenite is digested with concentrated sulfuric acid and a solution is obtained in which all the titanium and iron present in the ilmenite are dissolved completely, silicates and silica remaining insoluble. Thereafter, the titanium is precipitated and separated from the iron in solution by preparation of a basic sulfate, this basic sulfate being subsequently calcined to titanium dioxide. All of the previous methods for making compounds of titanium from ilmenite invariably involve dissolving the iron and titanium values of this mineral completely with acid.

For examples, as described in U. S. Patent 2,475,287, ilmenite is dissolved in sulfuric acid and the solution is then heated with calcium fluoride in an amount sufficient to convert all of the titanium to the fluoride. The ferric ion is then reduced to ferrous ion with iron scrap and the solution is filtered. The clear filtrate is treated with a mixture of hydrofluoric acid, sodium fluoride, potassium fluoride, and potassium chloride, and the resultant of this series of steps is the formation and precipitation of potassium titanium fluoride.

By the present invention, such complicated procedures are avoided, and fluorides may be produced without the handicaps of previously required costly reagents. Other objects and advantages will appear from the following description.

To the accomplishment of the foregoing and related ends, said invention then comprises the features hereinafter fully described and particularly pointed out in the claims, the following description setting forth in detail certain illustrative embodiments of the invention, these being indicative, however, of but a few of the various ways in which the principle of the invention may be employed.

In general, I treat a titanium ore with much less acid than has been used heretofore in procedures requiring decomposition of such ores.

It is desirable to notice the character of ores suitable such as available ilmenites, brookites, rutiles, and the like. Ilmenites normally occur in a variety of forms. The most important of these are in beach sand deposits originating from pegmatite or granitic sources which as the result of weathering by natural forces are broken up into sand. These beach sands consist of mixtures of ilmenite, zircon, rutile, monazite, quartz, and the like, and when suitably weathered are susceptible to separation by mechanical means such as magnetic, electrostatic, flotation, gravity, etc., for a more highly purified titanium source. The common sources are beach sands which after concentration may have a content of titanium dioxide varying between 50 and 60%. Other sources of supply are massive rock ilmenite in which the titanium oxide content is usually of the order of 42 to 47%. Still further sources are granitic types of deposits in which mixtures of ilmenite, granite, magnetite, and similar minerals are found and the ilmenite value is separated by mechanical methods generally. The massive ores of ilmenite, that is, the rock type, may also be beneficiated by crushing and froth flotation techniques, in which case the resultant titanium dioxide content may be above 50%.

Rutiles or brookites, particularly those which contain some substantial portion of iron have titanium dioxide contents in excess of 60% and up in some cases as high as 95%, are suitable also for the purposes of my invention, but in view of the cost of these higher titania derivatives such as rutile, the lower cost ilmenite is generally to be preferred as the source of supply. In addition, there is another advantage in the use of ilmenite. This advantage is that through use of my novel method, a valuable byproduct of iron is obtained in readily handleable form which is an item of commerce in the byproduct form in which it evolves in the course of my series of reactions.

In order to insure a high yield of useful products from the reactions to be described subsequently, it is desirable to have the ilmenite supplied in as pure form as possible. This is relatively simple when the ilmenite is available as a beach sand. Under these conditions, mechanical methods of concentration plus gravity methods such as shaking tables, produce an ilmenite which is substantially chemically pure and for all practical purposes, free of undesirable impurities such as silica and silicates. The massive and granitic type of ilmenites may be purified in similar fashion, in which case these ilmenites are crushed to a size such that all of the minerals are free, the size usually being less than 100 mesh, and then gravity, electromagnetic and electrostatic methods of separation are applied to the mineral to provide a product consisting of a substantially pure mineral.

I have found that if ilments is treated with approximately ⅔ of the amount of sulfuric acid needed to completely decompose the ilmenite in the presence of various alkali metal fluorides, and if the ilmenite is originally provided in a form in which all of the iron is present as ferrous iron, then the product of the reaction after suitable manipulation is an alkali metal titanium fluoride in good yield. The alkali metals useful in the practice of my invention include sodium, potassium and ammonium and the term "alkali metal" as employed herein refers to these metals and ammonium except where otherwise noted. In addition, another useful product is obtained in the form of a technically pure iron hydroxide, and this iron hydroxide is suitable for applications such as preparation of iron metal powder, ferrites, etc. If an amount of sulfuric acid is used which is sufficient to react with all of the ilmenite, then the products of the reaction are an alkali metal titanium fluoride and ferrous sulfate, in which case the ferrous sulfate may form mixed crystals with the alkali metal sulfate. Though this latter procedure works very well, economically it is not as attractive and for this reason, the more limited amount of acid is preferred.

In order that the ilmenite may be effective for the purposes of this description and to enable this decomposition with a limited amount of sulfuric acid, that is, an amount less than that usually required for complete decomposition of the ore, it is necessary that all of the iron in the ilmenite product be present in the divalent form. There are two reasons for this. The first is that ilmenite containing iron in such form is much more reactive chemically than if ferric iron is present. In addition, ferric iron requires a greater amount of sulfuric acid than ferrous iron for conversion to a sulfate.

It is convenient to put the ilmenite into the form just described by thermal reduction at elevated temperature. The usual reducing agents may be used if desired, such as carbon monoxide, elemental carbon, hydrogen, ammonia, and the like. These reductions take place most readily at temperatures of 1000° C. or higher. Of the various methods of reduction, those involving elemental carbon or carbon monoxide such as may be provided by a reducing flame are preferred.

In order to obtain the fullest benefit from the reducing type of reaction, the ilmenite is ground quite fine, usually —200 mesh and preferably to —325 mesh. If carbon is used as the reducing agent, generally speaking not more than about 10 parts by weight of carbon per 100 parts of ilmenite are needed. The type of carbon which is preferred is an ashless petroleum coke. The ilmenite and coke are ground together and the batch is then briquetted. The product is then heated in a rotary furnace in a neutral or reducing flame such that the ilmenite is subjected to temperatures of about 1000° C. to 1200° C. for periods of about an hour. In order to prevent the iron in the reduced ilmenite from reoxidizing to the ferric state, it is either discharged from the calciner into a closed container from which air is excluded or else quenched in water directly from the full calcining temperature in order to reduce the temperature of the batch as quickly as possible. In a second preferred method of reduction, the reduction is carried out entirely by heating in a reducing atmosphere such as carbon monoxide. In this case, a smoky flame usually is sufficient and again the same conditions of time and temperature are used. Under these conditions, briquetting is not necessary, though it is helpful to prevent clogging in the furnace. Again the product should be quenched as quickly as possible so as to prevent reoxidation of the ferrous iron in the compound. The reduction with ammonia or hydrogen is generally similar, but in view of the expense of these gases, this method is not preferred. The reduction is generally continued until some metallic Fe is present.

Once the ilmenite has been obtained in a condition where the iron is in the proper valence, it is then ground dry to a fineness such that it will pass through a —325 mesh screen.

With proper purification of the original ilmenite and if the reduction to ferrous oxide is complete, then the purified ilmenite will usually contain between 53 and 55% tianium dioxide and the treated mineral is then substantially equivalent to a compound having the formula $FeTiO_3$ which empirically is equivalent to a combination of one mole of ferrous oxide and one mole of titanium dioxide.

The fluorides suitable are the fluorides of the alkali metals including ammonia and of those alkaline earth metals which form relatively insoluble sulfates in water or in slightly acid solution, viz. calcium, strontium and barium. These fluorides may be used alone or in mixture with each other depending on the desired byproduct. When it is desired to recover a useful byproduct of iron in the form of the hydroxide or oxide, then a mixture of alkali metal fluorides is used or the fluorides of either sodium, potassium, or ammonium, may be used alone if desired. If there is no desire to recover the iron byproduct, then a mixture of an alkali metal fluoride and an alkaline earth metal fluoride is used in which case the desired double titanium fluoride compound is crystallized from a filtrate after separation from a complex precipitate of iron hydroxide and calcium sulfate. When it is desired to prepare the relatively soluble sodium titanium fluorides or ammonium titanium fluorides, then the reaction is carried out with the respective alkali metal fluoride plus the alkaline earth metal fluoride such as calcium fluoride or barium fluoride. In this case again the undesired products of reaction are separated as an insoluble precipitate and the desired sodium or ammonium double titanium fluoride is obtained from the filtrate by evaporation.

As has been stated before, the amount of acid used in combination with the ilmenite and the fluoride is ⅔ that normally used for complete destruction of the ilmenite. For example, if the ilmenite is considered as being the compounded $FeTiO_3$, then, theoretically, three moles of sulfuric acid will be required to place this ilmenite completely in solution. However, in the present reaction, two moles of sulfuric acid is sufficient to obtain the desired end product. On this basis, therefore, the following chemical reactions are a schematic representation of the novel procedure described herein:

(1) $FeO.TiO_2 + 2KF + 4NaF + 2H_2SO_4 \rightarrow K_2TiF_6 + 2Na_2SO_4 + Fe(OH)_2 + H_2O$ (2) $FeO.TiO_2 + 2KF + 2CaF_2 + 2H_2SO_4 \rightarrow K_2TiF_6 + 2CaSO_4 + Fe(OH)_2 + H_2O$ (3) $FeO.TiO_2 + 6KF + 2H_2SO_4 \rightarrow K_2TiF_6 + 2K_2SO_4 + Fe(OH)_2 + H_2O$ (4) $FeO.TiO_2 + NaF + 2CaF_2 + 2H_2SO_4 \rightarrow Na_2TiF_6 + 2CaSO_4 + Fe(OH)_2 + H_2O$ (5) $FeO.TiO_2 + 6NaF + 2H_2SO_4 \rightarrow Na_2TiF_6 + 2Na_2SO_4 + Fe(OH)_2 + H_2O$ add 2% (molar) NaCl based on $H_2SO_4$ plus 2% NaF or KF The foregoing list of equations represent the theoretical amounts of reagents needed to obtain the desired result. However, in practice, I have found that it is necessary to not only add small amounts of other reagents, but to make certain that certain of the standard agents are present in excess. For example, it is usually desirable that there be a slight excess of fluoride ion provided either through the medium of hydrofluoric acid directly or through a slight excess of one of the fluorides preferably of the alkali metal type, that is the water soluble type. In this case, enough excess of sulfuric acid also must be used in order to be equivalent stoichiometrically to the excess alkali metal fluoride, if this latter be used. The amount of excess involved usually does not exceed 3 to 4 molar % and 2 molar % is generally sufficient. In addition to this excess fluoride ion, the reaction proceeds more effectively if a small amount of chloride ion is also present. This again may be supplied directly as hydrochloric acid or may also be supplied in the form of sodium or potassium chloride. Again in this latter case, an amount of sulfuric acid equivalent stoichiometrically to this sodium or potassium chloride serves the same purpose. Under these conditions, the amount of chloride ion need not exceed 2 or 3 molar % in total content in order to make the reaction proceed as desired. It appears that the excess fluoride ion insures the relatively quantitative precipitation of the double fluoride in the final reaction. In addition, it also makes certain that the fluoride which precipitates or is evaporated out from the solution is the normal fluoride and does not contain any substantial proportion of oxygenated compound. The function of the chloride ion is obscure and its action may best be described as that of a catalyst. In its absence, the reaction goes very sluggishly probably due to the preliminary formation of insoluble iron fluorides on the surface of the ilmenite particles. The presence of the chloride ion aids in the rapid destruction or dispersion of this ferrous fluoride which makes it possible for all the ilmenite to be decomposed in the reaction. When all these extra catalytic and precipitation agents are used in proper amount, the molar excess of sulfuric acid never need exceed 10% of that represented by the equations given in the foregoing.

In general, the reaction is carried out somewhat as follows: the reduced ilmenite is slurried up with enough water to make a thin paste. The finely powdered fluorides are then added and the whole is stirred carefully. The chloride used for catalytic purposes is also added. Then finally the sulfuric acid in 50% solution form is added to the batch drop-wise and with continued stirring. An exothermic reaction begins to take place with the addition of the sulfuric acid and the addition of the sulfuric acid is metered so that the temperature does not exceed approximately 100° C. Once all of the sulfuric acid has been added, the solution is diluted sufficiently so that it may be digested without causing undue heating in any portion of the receptacle and a jet black precipitate of flocculant nature is formed in the process. On continued digesting, this jet black precipitate turns a distinct brown and once this brown color has appeared, the reaction is considered to be completed. The resulting solution is diluted with hot water, stirred, and the precipitate removed by filtration. The desired double fluoride of titanium and an alkali metal is removed from the filtrate either by crystallization or evaporation. When the ilmenite is pure, the iron compound obtained is also pure and after drying and calcining it is then ready for subsequent commercial utilization, in whatever manner desired. When the ilmenite contains any portion of silica or silicates, these remain with the iron hydroxide precipitate. As indicated by the reactions, the filtrate containing the alkali metal double fluoride may or may not contain water-soluble alkali metal sulfate. The nature of the crystallization which takes place thereafter depends to a certain extent on the presence or absence of this alkali metal sulfate.

As indicated inferentially, certain precautions are necessary. It is imperative that all of the iron present in the ilmenite be reduced to the divalent stage and the reduction to the presence of a small amount of Fe metal is preferred. The sulfuric acid content is metered in accordance with the actual analytical contents of iron and titania on the basis of one mole of sulfuric acid for each atom of iron and one mole of sulfuric acid for each atom of titanium present. On the same basis, the various amounts of fluorides are also determined, this being in accordance with usual chemical requirements. In the treatment of the batch of ilmenite with mixed fluorides, it is necessary that some fluoride ion be present before the sulfuric acid is mixed in with the batch and it is also necessary that the batch be vigorously stirred. The temperature is not allowed to exceed 100° C. approximately in the initial decomposition reaction. The water content to which the material is subsequently diluted is sufficient so that stirring is relatively easy and the amount of water finally used in this stirring and filtration reaction must never be more than approximately that equivalent to a ratio of 10 grams of the double titanium fluoride compound per 100 grams of solution. The relative insolubility of this sparingly soluble double compound makes this requirement a necessity. When sodium sulfate is present in solution, the precipitation of the double titanium fluoride is complete at a greater dilution than in its absence and this factor must also be taken into account in determining the amount of water used from which the crystallization is made to commence. As indicated, the excess fluoride ion must always be present during this precipitation and any washing of precipitates to remove the last amounts of water soluble titanium compounds should contain a slight amount of sulfuric acid plus a slight amount of fluoride ion, preferably in the form of the potassium compound. While the initial digestion may not rise above 100° C., the final digestion in which the iron hydrate precipitate is consolidated and the filtration takes place may be carried out at a temperature of the order of 70° to 90° C. The usual methods of decantation, filtration, and so forth are sufficient for separation of a desired complex.

When properly carried out, the yield of iron is substantially quantitative, that is in the region of 99 to 100%. The yield of the desired alkali metal double fluoride compound is usually between 90 and 97%. Only a small portion of this deficit represents any lack of quantitativeness in the reaction. The majority is represented by losses of absorption on the insoluble iron hydrate and losses in the recrystallization procedure which is used for obtaining the pure compound.

Also, I have found that it is possible to decompose the reduced ilmenite into an alkali metal fluotitanate in a single step, using an amount of sulfuric acid approximately equivalent to ⅓ of that theoretically equivalent to the amount usually required to completely decompose the ilmenite. In addition, this makes it possible to use the presently most economical source of combined alkali metal and fluorine in a most direct fashion, this economical source being the fluosilicates of either potassium or sodium. Fluosilicates of potassium or sodium are by-products of the phosphate industry and under the present situation, the item represents a surplus commodity which is available on the market at a very low price. Thus basically, my novel procedures involve the interaction under proper conditions of one mole each of ilmenite, the applicable alkali metal fluosilicate, and sulfuric acid, providing in a single step a pure alkali metal fluotitanate in the condition such that it can be crystallized from the solution readily in pure form and at good yield.

In general, the dry ingredients are all provided in −325 mesh form and are thoroughly mixed, then slurried up with water, the excess fluoride and chloride ion added and sulfuric acid in fairly concentrated form added with continued stirring and heating. In this case, the reaction is carried out under conditions which will insure the maintenance of the temperature of the reaction between 90° and 100° C. In a modification, the finely ground ilmenite, the sodium fluosilicate, the sodium chloride, or other alkali metal chloride and the slight excess of alkali metal fluoride are all thoroughly and intimately mixed with each other in finely powdered form and are then first calcined at 600 to 800° C. in a reducing atmosphere for a short period of time until a complete sinter is formed. This sinter is then crushed and finely comminuted and treated with sulfuric acid as before.

The schematic reactions which take place in these cases without regard for the excess fluoride or catalytic chloride ion are as follows:

(1) $FeO.TiO_2 + K_2SiF_6 + H_2SO_4$ will yield

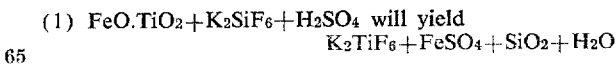
$K_2TiF_6 + FeSO_4 + SiO_2 + H_2O$

When the sodium derivative is desired to be formed, the reaction is identical with the foregoing except that sodium takes the places of the potassium ion. And here in general, one mole of reduced ilmenite is mixed with one mole of potassium fluosilicate and ground until the particle size is such that the batch may be sifted through a −325 mesh screen on a quantitative basis. An amount of water is then added to form a stirrable slurry, after which a small percentage of accelerator fluorine and chlorine ions such as potassium fluoride and sodium chloride is added, and the stirring continued until these latter go into solution. The slurry is then heated to a temperature of approximately 90° C. A 50% solution of sulfuric acid is then provided which contains one mole of sulfuric acid with an extra amount equivalent to the amount of sodium chloride. Cold water is provided in a separate receptacle. The sulfuric acid is then added slowly with stirring while maintaining the temperature at 90° to 100° C. After a small amount of the sulfuric acid has been added, a violent reaction starts and the temperature is prevented from rising unduly by the addition of the cold water available in a separate container. The addition of the sulfuric acid is continued until complete, and the batch is then digested for several minutes at the aforementioned temperature. The solution is tested continually to make certain that all of the iron is maintained in the ferrous condition. This usually is readily assured through the presence of metallic iron. If an insufficient amount of metallic iron is present for the reduction of ferric iron, then powdered iron is added to the reaction mass, and for every amount of powdered iron added, an extra amount of sulfuric acid must also be added to make certain that it will combine completely with such powdered iron. Under normal conditions, however, providing the reduction of the ilmenite is properly carried out in the first place, there is usually no necessity for the addition of such powdered iron. After digestion for a suitable length of time until it is evident that every bit of the ilmenite has been decomposed, and the solution shows a clear green color with a white flocculant precipitate therein, the solution is then diluted to an extent such as to insure that all of the potassium titanium fluoride which forms is completely maintained in solution. A safe procedure for the dilution is to have an amount of water sufficient that for each 20 grams of potassium titanium fluoride, 100 grams of liquid are available. While still maintaining the solution in this hot condition, the stirring is stopped and the container covered to prevent access of air, and the precipitates are allowed to settle. As much of the clear liquid resulting from this settling as possible is decanted into a crystallizing chamber. This pure liquid will contain the majority of the alkali metal double fluoride and ferrous sulfate in solution. The precipitate consists chiefly of hydrated silica. This is separted from solution by further washing, decantation, settling, filtration, and the like. The silica is washed with water containing a small percentage of sulfuric acid and potassium chloride or potassium fluoride, and these washings are combined with the original decants. The decanted solution is then concentrated hot to the point where the concentration of the potassium titanium fluoride is roughly 40% of the total volume. On cooling, the potassium titanium fluoride is separated from the iron sulfate by crystallization, and generally a double treatment is sufficient to insure a chemically pure product. In developing the crystallization of the compound, it is important that it be initiated from a temperature in the realm of 90° C. If the solutions are allowed to cool to too low a temperature before the first crystals of potassium titanium fluoride appear, then they are fine and slimy and difficult to separate from the iron sulfate by filtration or other means. Under the conditions, the first crystals of potassium titanium fluoride will normally show on evaporation of the filtrates when the concentration reaches roughly 40% alkali metal double fluoride.

In some cases a modification is advantageous including the use of calcination. The advantage of calcination is that it eliminates the need for the chloride ion catalyst which is required in the low temperature reaction described above. However, the excess of fluoride is still necessary in order to insure the substantially quantitative precipitation of the alkali metal titanium fluoride. In this procedure, one mole of the properly reduced iron titanate made from ilmenite is mixed with one mole of the finely powdered alkali fluosilicate such as potassium fluosilicate or sodium fluosilicate. The batch is then calcined in a reducing atmosphere at a temperature in the range of 600° C. to 800° C. which forms a sinter of a green-brown color. The excess fluoride ion is also present during this sintering reaction. The sinter is removed from the reaction zone and is then crushed to a —325 mesh powder and slurried up with water, after which sulfuric acid is added as before and the same general requirements of procedure apply as previously described. Again insurance must be had of a positive nature that all of the iron is in the ferrous condition, and this may be accomplished through the occasional addition of metallic iron to the reaction, making certain that if such metallic iron is added, excess sulfuric acid is provided at the same time. We may summarize the nature of the novel reactions involving the alkali metal fluosilicates described above as follows: Ilmenite treated as herein above described so that all of its iron content is in the divalent condition is mixed with an alkali metal fluosilicate and sulfuric acid. After proper manipulaton, the complex double fluoride of titanium of the respective alkali metal may be separated by crystallization, leaving ferrous sulfate as a byproduct in solution and silicic acid as a separable precipitate. The reaction with the fluosilicate is best accomplished at an elevated temperature in the region of 600° C. to 800° C. because this provides the silica in a form where it is more readily separated by filtration than if carried out at 100° C. for instance.

Having described my invention, the following examples are illustrative of my method:

*Example 1.*—A purified Indian ilmenite was used. This is a beach sand type of ore. The ilmenite was ground to —325 mesh and in the latter stages of the grinding 10 pounds of ashless petroleum coke added for every 100 pounds of ilmenite. The thoroughly mixed and ground batch was then tempered with about 3 parts of water and formed into briquettes. The briquettes of ilmenite were then heated into a rotary furnace using a neutral flame at a temperature between 1000° and 1200° C. and maintained at this temperature for about an hour, after which the briquettes were discharged into water. The water was drained off and the briquettes dried at 100° C., after which the batch was ground to —325 mesh. Practically all of the coke was eliminated as a result of the calcining, and in cases where coke still remained, it is not deleterious as far as the resulting reaction is concerned. The particular batch of ilmenite referred to analyzed approximately the 54% of titanium dioxide which is roughly equivalent to the pure compound $FeTiO_3$. This ground ilmenite in amount of 152 grams was dispersed in 100 cc. of water. 119 grams of potassium fluoride and 168 grams of sodium fluoride were added to this water dispersion of ilmenite and the batch was stirred to a thick paste. After the batch stiffened somewhat, another 100 cc. of water was added and the stirring again continued, then 5 grams of sodium chloride were added to the pasty batch and the stirring continued. A solution of sulfuric acid is made up in a separate container with 205 grams of 98% sulfuric acid and 200 cc. of water. The stiff batch of ilmenite, potassium fluoride, sodium fluoride, sodium chloride and water is then stirred vigorously and the sulfuric acid is let in drop by drop. A localized reaction takes place and the temperature begins to rise. 300 cc. of water in a separate container is led in along with the sulfuric acid at a rate to insure that the temperature does not rise above 100° C. The simultaneous addition of sulfuric acid and water is continued with continuous stirring and is completed over the course of about 20 to 30 minutes. Upon the completion of the reaction, the temperature is in the region of 90° to 100° C. and the batch is digested under these conditions for 20 to 30 minutes longer, then the batch is diluted to a total volume of approximately 2500 cc. with hot water and while maintaining the temperature at approximately 90 to 95° C., the batch is allowed to settle and the clear liquid is decanted. The warm sludge is thrown on a filter and washed with hot water containing 1% sulfuric acid and 1% potassium fluoride and the washings are added to the original filtrate. The combined filtrates are evaporated to approximately 1000 cc. and are then cooled to room temperature. A white crystalline precipitate is formed which is dewatered on a centrifuge and dried. 245 grams of product is obtained after the crystals are dried at approximately 80° C. This product is $K_2TiF_6 \cdot H_2O$. The loss in weight from theoretical is roughly 14 grams which is substantially equivalent to the amount which is soluble in the 1000 cc. of solution. Reduction of the volume of solution to 200 cc. before crystallization takes place suffices to recover over 50% of the discrepancy in yield.

In the original digestion of the precipitate before dilution, the precipitate was a jet black color. After dilution and continuation of the digestion, the color of the precipitate changed rapidly from black to brown and this change in color was evident in the latter stages of the concentrated digestion. The filtered product was dried and calcined and was found to weigh 75 grams. Chemical analysis indicated that this had a formula approximately $Fe_3O_4$ and contained a small amount of silicious impurity. This is the compound which would form on calcination of $Fe(OH)_2$.

*Example 2.*—The same procedure as in Example 1 except that 156 grams of —325 mesh calcium fluoride was substituted for the sodium fluoride. The excess in quantity of sulfuric acid, potassium fluoride, and the catalyst sodium fluoride were added as above. In this case, the precipitate consisted of a mixture of calcium sulfate and iron hydroxide, and a digestion time roughly twice that required in Example 1 for the first portion of the reaction was required here due to the relative slowness of the decomposition of the fluorspar. The yield of potassium titanium fluoride hydrate was about 247 grams representing a yield in excess of 90%.

*Example 3.*—The same as in Example 1 except that the fluoride used throughout was potassium fluoride. The amount of potassium fluoride used was 360 grams. Again the excess of sulfuric acid, the small amount of sodium chloride were used as before. Approximately the same yields of potassium titanium fluoride and magnetic iron oxide were obtained as in Example 1. In this case, however, the potassium sulfate resulting from the reaction was recovered by crystallization.

*Example 4.*—Same as in Example 1 except that 156 grams of calcium fluoride and 90 grams of sodium fluoride were used. Again the small amount of sodium chloride as in Example 1 was used. The precipitate consisted of a mixture of calcium sulfate and iron hydroxide, and the sodium titanium fluoride in the filtrate was recovered by evaporation almost entirely to dryness before crystallization was allowed to proceed. 225 grams of product were obtained apparently equivalent to the formula $Na_2TiF_6 \cdot H_2O$, in substantially quantitative yield.

*Example 5.*—Same as in Example 4 except that 360 grams of sodium fluoride was used in place of the combination of sodium fluoride and calcium fluoride indicated in Example 4. Again the excess was sulfuric acid and the small amount of sodium chloride was used as previously. In this case, the precipitate consisted of iron hydroxide and the yield of iron hydroxide after calcination was substantially the same as obtained in Example 1 and equivalent to the formula $Fe_3O_4$. The complex fluoride and sulfate were separated by fractional crystallization, and 220 grams of purified hydrated sodium titanium fluoride were obtained, sodium sulfate remaining in the solution.

*Example 6.*—150 grams of the ilmenite with iron reduced to ferrous state as indicated in the foregoing and in the —325 mesh form is thoroughly mixed with 220 grams of potassium fluosilicate. 5 grams of potassium fluoride, and 5 grams of sodium chloride. The batch is slurried up with 100 cc. of water and is then heated with stirring to about 100° C. A 50% solution of sulfuric acid containing 107 grams of $H_2SO_4$ is then added slowly with stirring to the reaction and in a separate container, cold water is made available. The addition of the sulfuric acid to the mixture of the fluosilicate and finely ground ilmenite initiates a rather violent exothermic reaction and the temperature is maintained at 100° C. or less through quenching with the cold water. The temperature is not permitted to drop below 90° C. A considerable gas evolution takes place during the course of the reaction due to the destruction of the metallic iron, and the course of the reaction is clearly indicated by the rapid elimination of the black sludge which is the original color of the ground ilmenite. After all the water and acid has been added, the container is covered to prevent access of air, and the digestion is continued until all of the ilmenite is completely decomposed. This normally requires about 30 minutes of digestion at around the boiling point. At this stage, the solution has a pale green color and contains a white highly flocculant precipitate. The solution is checked analytically to make certain no ferric iron is present, and if ferric iron is present a few grams of powdered iron are added to accomplish the complete reduction to the ferrous state. Once it is certain that all the iron is in the divalent condition and that all the ilmenite is decomposed, the solution is then diluted to a volume of approximately 3000 cc. with water which has been previously heated to 90° C. and the digestion is continued for a few minutes to make certain that all soluble constituents have gone into solution. While maintaining the temperature in the range of 90° to 95° C., the precipitate is allowed to settle until a clear supernatant liquid is obtained. This clear liquid is then decanted and the precipitate is washed once with hot water containing 1% sulfuric acid and 1% potassium fluoride. The decant from the washing is added to the first filtrate. The precipitate is then washed on a filter using wash water of the same type as indicated in the foregoing. All of the filtrates and decants are combined and the solution is evaporated to approximately 1500 cc. in volume at which stage the liquid is allowed to cool to room temperature. During the cooling, a coarsely crystalline white product is formed which is potassium titanium fluoride monohydrate. After cooling and standing for several hours, the crop of crystals is thrown into a centrifuge and washed with water containing 1% potassium fluoride and then spun dry. 235 grams is the weight of the product after drying to 80° C. and the analysis indicates that it is potassium titanium fluoride monohydrate.

In order to obtain coarse crystals, it is usually advisable to continue the first evaporation until the first signs of crystallization develop. Once this stage has commenced which is in the region of the volume indicated, then the batch is allowed to cool to final crystallization.

*Example 7.*—Same as in Example 6 except that 188 grams of sodium fluosilicate are used in place of the 220 grams of the potassium fluosilicate. Approximately 180 grams of product consisting of monohydrated sodium titanium fluoride are obtained as a result of the operation. The somewhat lower yield of the sodium compound relative to the potassium compound is the result of the somewhat higher solubility of the sodium compound.

*Example 8.*—150 grams of the reduced ilmenite of —325 mesh form is thoroughly mixed with 220 grams of —325 mesh potassium fluosilicate. 5 grams of powdered KF and 5 grams of sodium chloride are also added and the batch is ground vigorously. It is then calcined in a smoky flame at a temperature not less than 600° C. and not more than 800° C. for one hour and a heavy sinter is developed. This calcination is carried out in a covered graphite crucible to insure the complete absence of oxidizing conditions. After cooling, the calcine is crushed and ground in water to −325 mesh form. During this crushing and grinding, a flocculant black precipitate is formed. From this point on, the operation is substantially equivalent to that given in Example 6, namely 50% sulfuric acid of the same amount as indicated in Example 6 is added to the stirred slurry at a temperature in the range of 90° to 100° C., and again it is required that assurance be had that the iron is maintained fully in the ferrous condition. The filtration, decantation, and separation of the insoluble silicious residue is more efficient in this case than in Example 6. A yield of 240 grams of monohydrated potassium titanium fluoride is obtained as a result of the first crystallization.

*Example 9.*—Same as Example 8 except that 188 grams of sodium fluosilicate is substituted for potassium fluosilicate. Again the operation proceeds more efficiently in view of the greater ease of separation of the silicious residue and a yield of 185 grams of monohydrated sodium titanium fluoride is obtained.

Other modes of applying the principle of the invention may be employed, change being made as regards the details described, provided the features stated in any of the following claims or the equivalent of such be employed.

I therefore particularly point out and distinctly claim as my invention:

1. The method of producing a fluotitanate of the group consisting of sodium, potassium and ammonium fluotitanates from a ferric iron-containing titanium ore which comprises heating the ore at a temperature of at least about 1000° C. with an amount of a reducing agent sufficient to reduce substantially all of the iron component of the ore to the ferrous state, comminuting the thus-reduced ore, adding to the comminuted reduced ore a source of combined fluorine from at least one of the following: alkali metal fluorides, alkali metal fluosilicates, and mixtures of alkali metal fluorides and alkaline earth fluorides, adding to the ore-fluorine salt mixture sulfuric acid in the proportion of one mole of acid for each mole of $FeTiO_3$ when the fluorine is provided by an alkali metal fluosilicate and in the proportion of one mole of acid for each mole of ferrous oxide and one mole of acid for each mole of titania in the reduced ore when the fluorine is provided as a fluoride, reacting the thus-reduced ore with the added fluorine and added acid, and recovering the resulting double fluoride of titanium and said alkali metal.

2. The method of producing a fluotitanate of the group consisting of sodium, potassium and ammonium fluotitanates from a ferric iron-containing titanium ore which comprises heating the ore at a temperature of at least about 1000° C. with an amount of a reducing agent sufficient to reduce substantially all of the iron component of the ore to the ferrous state, comminuting the thus-reduced ore, adding at least one alkali metal fluoride to the comminuted reduced ore, adding to the ore-fluorine salt mixture sulfuric acid in the proportion of one mole of acid for each mole of ferrous oxide and one mole of acid for each mole of titania in the reduced ore, reacting the thus-reduced ore with the added fluorine and added acid, and recovering the resulting double fluoride of titanium and said alkali metal.

3. The method of producing a fluotitanate of the group consisting of sodium, potassium and ammonium fluotitanates from a ferric iron-containing titanium ore which comprises heating the ore at a temperature of at least about 1000° C. with an amount of a reducing agent sufficient to reduce substantially all of the iron component of the ore to the ferrous state, comminuting the thus-reduced ore, adding at least one alkali metal fluoride to the comminuted reduced ore, adding to the ore-fluorine salt mixture sulfuric acid in the proportion of one mole of acid for each mole of ferrous oxide and one mole of acid for each mole of titania in the reduced ore, reacting the thus-reduced ore with the added fluorine and added acid in an aqueous medium, with the resultant production of an aqueous solution of the double fluoride of titanium and said alkali metal and precipitation of iron hydroxide, separating the iron hydroxide from said solution and recovering the double fluoride from said separated solution.

4. The method of producing a fluotitanate of the group consisting of sodium, potassium and ammonium fluotitanates from a ferric iron-containing titanium ore which comprises heating the ore at a temperature of at least about 1000° C. with an amount of a reducing agent sufficient to reduce substantially all of the iron component of the ore to the ferrous state, comminuting the thus-reduced ore, adding at least one alkali metal fluoride and at least one alkaline earth metal fluoride to the comminuted reduced ore, adding to the ore-fluorine salt mixture sulfuric acid in the proportion of 1 mole of acid for each mole of ferrous oxide and one mole of acid for each mole of titania in the reduced ore, reacting the thus-reduced ore with the added fluorine and added acid, and recovering the resulting double fluoride of titanium and said alkali metal.

5. The method of producing a fluotitanate of the group consisting of sodium, potassium and ammonium fluotitanates from a ferric iron-containing titanium ore which comprises heating the ore at a temperature of at least about 1000° C. with an amount of a reducing agent sufficient to reduce substantially all of the iron component of the ore to the ferrous state, comminuting the thus-reduced ore, adding at least one alkali metal fluosilicate to the comminuted reduced ore, adding to the ore-fluorine salt mixture sulfuric acid in the proportion of one mole of acid for each mole of $FeTiO_3$, reacting the thus-reduced ore with the added fluorine and added acid, and recovering the resulting double fluoride of titanium and said alkali metal.

6. The method of producing a fluotitanate of the group consisting of sodium, potassium and ammonium fluotitanates from a ferric iron-containing titanium ore which comprises heating the ore at a temperature of at least about 1000° C. with an amount of a reducing agent sufficient to reduce substantially all of the iron component of the ore to the ferrous state, comminuting the thus-reduced ore, adding at least one alkali metal fluosilicate to the comminuted reduced ore, adding to the ore-fluorine salt mixture sulfuric acid in the proportion of one mole of acid for each mole of $FeTiO_3$, calcining the thus-reduced ore with the added fluorine and added acid at a temperature of about 600°–800° C., digesting the resulting calcine in sulfuric acid, and recovering the resulting double fluoride of titanium and said alkali metal from said digestion liquor.

References Cited in the file of this patent

UNITED STATES PATENTS

| | | |
|---|---|---|
| 2,475,287 | Kawecki | July 5, 1949 |
| 2,476,453 | Pierce et al. | July 19, 1949 |
| 2,577,130 | Kawecki | Dec. 4, 1951 |

UNITED STATES PATENT OFFICE
Certificate of Correction

Patent No. 2,812,237                        November 5, 1957

Eugene Wainer

It is hereby certified that error appears in the printed specification of the above numbered patent requiring correction and that the said Letters Patent should read as corrected below.

Column 1, line 53, for "examples" read —example—; column 2, line 59, for "ilments" read —ilmenite—; column 3, line 70, for "tianium" read —titanium—; column 4, line 29, for "compounded" read —compound—; line 43, for that portion reading "(4) $FeO.TiO_2 + NaF$" read —(4) $FeO.TiO_2 + 2NaF$—; column 6, lines 13 and 14, for "dectantation" read —decantation—; line 68, for "places" read —place—; column 8, lines 21 and 22, for "manipulaton" read —manipulation—; column 10, line 2, for "fluosilicate." read —fluosilicate,—; line 45, after "stage" insert a comma; column 12, line 10, for "aqueuos" read —aqueous—; line 25, for "1 mole" read —one mole—.

Signed and sealed this 28th day of January 1958.

[SEAL]

Attest:
KARL H. AXLINE,
*Attesting Officer.*

ROBERT C. WATSON,
*Commissioner of Patents.*